United States Patent [19]
Naitou et al.

[11] Patent Number: 4,968,965
[45] Date of Patent: Nov. 6, 1990

[54] APPARATUS FOR RECORDING AN OPERATING CONDITION OF A VEHICLE SAFETY DEVICE

[75] Inventors: Motoharu Naitou, Okazaki; Mitsuhiko Masegi, Aichi; Akira Kondo, Okazaki, all of Japan

[73] Assignee: Nippondenso Co., Ltd., Kariya, Japan

[21] Appl. No.: 359,282

[22] Filed: May 31, 1989

[30] Foreign Application Priority Data

Jun. 1, 1988 [JP] Japan .................. 63-134729
Mar. 8, 1989 [JP] Japan .................. 1-55609

[51] Int. Cl.$^5$ .................................................. B60Q 1/00
[52] U.S. Cl. .................................... 340/436; 180/272; 180/282; 280/735
[58] Field of Search .............. 340/436, 438; 180/274, 180/282; 280/735; 307/10.1

[56] References Cited

U.S. PATENT DOCUMENTS

| | | |
|---|---|---|
| 3,622,974 | 11/1971 | Best et al. . |
| 3,849,759 | 11/1974 | Hosaka et al. . |
| 3,863,208 | 1/1975 | Balban .................. 340/438 |
| 3,890,594 | 6/1975 | Hosaka et al. . |
| 3,909,777 | 9/1975 | Baba et al. .................. 180/274 |
| 3,949,357 | 4/1976 | Hosaka . |
| 4,016,426 | 4/1977 | Nishioka .................. 307/10.1 |
| 4,086,562 | 4/1978 | Hasegawa .................. 280/735 |
| 4,220,871 | 9/1980 | Yasui et al. . |
| 4,278,971 | 7/1981 | Yasui et al. . |
| 4,287,431 | 9/1981 | Yasui et al. . |
| 4,346,913 | 8/1982 | Schrauf et al. . |
| 4,366,465 | 12/1982 | Veneziano .................. 280/735 |
| 4,438,424 | 3/1984 | Yasui . |
| 4,641,041 | 2/1987 | Mattes et al. .................. 340/438 |
| 4,836,024 | 6/1989 | Woehrl et al. .................. 340/436 |

Primary Examiner—Joseph A. Orsino
Assistant Examiner—Brent A. Swarthout
Attorney, Agent, or Firm—Cushman, Darby & Cushman

[57] ABSTRACT

An acceleration sensor detects an acceleration of a vehicle which is caused by a collision of the vehicle. A safety device protects an occupant in the vehicle from the collision of the vehicle. A trigger device triggers the safety device. The trigger device is activated in response to an output signal from the acceleration sensor. An operation of the trigger device is detected and a detection signal representative thereof is generated. A first judgment device judges whether or not the trigger device is activated on the basis of the detection signal. When the trigger device is judged to be activated, a second judgment device judges whether the activation of the trigger device is caused by a correct cause or a false cause on the basis of the output signal from the acceleration sensor. The judgment by the second judgment device is allowed only once and subsequent judgments by the second judgment device are inhibited. A result of the judgment by the second judgment device is recorded.

3 Claims, 6 Drawing Sheets

FIG. 2

| MALFUNCTION MODE | VOLTAGE AT POINT A | VOLTAGE AT POINT B | SIGNAL A' | SIGNAL B' |
|---|---|---|---|---|
| NORMAL | V3 | V4 | L | H |
| SQUIB BROKEN | 0 | V5 | H | H |
| MERCURY SW4 SHORT-CIRCUITED | V6 | VB | L | L |
| TRANSISTOR 7 WRONG | 0 | V1 | H | H |
| FIRE | 0 | VB | H | L |
| SQUIB BROKEN MERCURY SW4 SHORT-CIRCUITED | V2 | VB | L | L |
| SQUIB BROKEN TRANSISTOR 7 WRONG | 0 | V5 | H | H |

{ WARNING LAMP 84 ACTIVATED (rows 2–4)
{ WARNING LAMP 84 ACTIVATED (rows 6–7)

$0 < V1 < V2 < V3 < V4 < V5 < V6 < VB$

APPARATUS FOR RECORDING AN OPERATING CONDITION OF A VEHICLE SAFETY DEVICE

BACKGROUND OF THE INVENTION

1. Field of the Invention

This invention relates to an apparatus for recording an operating condition of a vehicle safety device such as a vehicle air bag device.

2. Description of the Prior Art

Japanese published unexamined patent application 56-5242 corresponding to U.S. Pat. No. 4,346,913 discloses a false release registering circuit for collision protective devices in which a fuse serving as a storage register indicates whether a normal release or a false release has taken place. Specifically, when the fuse is unmelted, it represents that a normal release has taken place. When the fuse is blown, it represents that a false release has taken place.

In the circuit of Japanese patent application 56-5242, the fuse or the storage register receives a recorded signal even after an air bag device is activated. Accordingly, in cases where a wire harness connected to a firing device for the air bag device is short-circuited by a collision shock, the short circuit of the wire harness causes a condition similar to a false release after the air bag device is activated which causes the fuse to blow In these cases, the information indicated by the fuse is unreliable.

SUMMARY OF THE INVENTION

It is an object of this invention to provide a reliable apparatus for recording an operating condition of a vehicle safety device.

In a system comprising an acceleration sensor detecting an acceleration of a vehicle which is caused by a collision of the vehicle, a safety device protecting an occupant in the vehicle from the collision of the vehicle, a trigger device triggering the safety device, and means for activating the trigger device in response to an output signal from the acceleration sensor, an apparatus is provided for recording an operating condition of the trigger device. According to a first aspect of this invention, the apparatus comprises means for detecting an operation of the trigger device and generating a detection signal representative thereof; first judgement means for judging whether or not the trigger device is activated on the basis of the detection signal; second judgment means for, when the trigger device is judged to be activated, judging whether the activation of the trigger device is caused by a correct cause or a false cause on the basis of the output signal from the acceleration sensor; means for allowing the judgement by the second judgement means only once and inhibiting subsequent judgments by the second judgment means; and means for recording a result of the judgment by the second judgment means.

In accordance with a second aspect of this invention, an apparatus for recording an operating condition of a vehicle safety device comprises: means for triggering the safety device when supplied with an electric current equal to or greater than a reference electric current; means for detecting an acceleration of a vehicle which is caused by a collision of the vehicle, and outputting an electric signal depending on the detected vehicle acceleration; means for deciding whether or not the triggering means should be activated on the basis of the electric signal from the acceleration detecting means; switch means, turned on in response to an output signal from the deciding means, for supplying an electric current equal to or greater than the reference electric current to the triggering means to activate the triggering means; means for detecting voltages at respective two ends of the triggering means; means for detecting an activating condition of the triggering means on the basis of the detected voltages; activation storing means for storing the detected activating condition of the triggering means; collision storing means for storing the detection of the collision acceleration by the acceleration detecting means; means when the acceleration detecting means detects the collision acceleration for judging the triggering means to be activated by a correct cause in cases where, during a predetermined time starting from a moment of the detection of the collision acceleration by the acceleration detecting means, the activation storing means stores the activating condition of the triggering means and the collision storing means stores the detection of the collision acceleration by the acceleration detecting means, for judging the triggering means to be activated by a false cause in other cases, and for outputting a signal representing a result of the judgments; means responsive to the output signal from the judging means for recording that the triggering means is activated by a false cause; and means for limiting a number of times of the judgments by the judging means to one.

In a third aspect of this invention, an apparatus for recording an operating condition of a vehicle safety device comprises: a squib for triggering the safety device when supplied with an electric current equal to or greater than a reference electric current; an acceleration sensor for detecting an acceleration of a vehicle which is caused by a collision of the vehicle, and outputting an electric signal depending on the detected vehicle acceleration; a fire decision circuit for deciding whether or not the squib should be fired on the basis of the electric signal from the acceleration sensor; a first switch, connected to the squib and turned on in response to a fire signal from the decision circuit, for supplying an electric current equal to or greater than the reference electric current to the squib to fire the squib; a first connection point and a second connection point connected to respective two ends of the squib and conducting voltages at the respective two ends of the squib; a second switch turned on and outputting a first signal when a voltage at the first connection point is equal to or higher than a first reference voltage; a third switch outputting a second signal when a voltage at the second connection point exceeds a second reference voltage; a fourth switch outputting a third signal depending on the electric output signal from the acceleration sensor; a microcomputer performing calculation processes on the basis of the first signal, the second signal, and the third signal, wherein the microcomputer comprises means for judging whether or not the squib is fired on the basis of the first signal and the second signal; a memory receiving an output signal from the microcomputer means for, when the squib is judged to be fired, judging the fire of the squib to be performed by a false cause in cases where the acceleration sensor does not output an electric signal of a level equal to or higher than a predetermined level for a last predetermined time interval; and means for recording information into the memory, the information representing that the fire of the squib is performed by the false cause; and means for limiting a number of times of the recording of the information into the memory to one.

In accordance with a fourth aspect of this invention, an apparatus for recording an operating condition of a vehicle safety device comprises: a squib for triggering the safety device when supplied with an electric current equal to or greater than a reference electric current; an acceleration sensor for detecting an acceleration of a vehicle which is caused by a collision of the vehicle, and outputting an electric signal depending on the detected vehicle acceleration; a fire decision circuit for deciding whether or not the squib should be fired on the basis of the electric signal from the acceleration sensor; a first switch, connected to the squib and turned on in response to a fire signal from the decision circuit, for supplying an electric current equal to or greater than the reference electric current to the squib to fire the squib; a first connection point and a second connection point connected to respective two ends of the squib and conducting voltages at the respective two ends of the squib; a second switch turned on and outputting a first signal when a voltage at the first connection point is equal to or lower than a first reference voltage; a third switch outputting a second signal when a voltage at the second connection point exceeds a second reference voltage; a fourth switch outputting a third signal in response to an electric output signal from the acceleration sensor which has a level equal to or greater than a predetermined level, the third signal having a predetermined short duration; a storage circuit set in response to the first signal and the second signal and outputting a fourth signal only once when being set, the fourth signal having a predetermined short duration; a fifth switch for judging whether the fire of the squib is performed by a correct cause or a false cause on the basis of the third signal and the fourth signal, and for outputting a false-fire-representing signal when the fire of the squib is performed by the false cause; and a memory for recording the false-fire-representing signal.

BRIEF DESCRIPTION OF THE DRAWINGS

FIG. 2 is a table showing the relationship among the voltages at the points A and B, the signals A' and B' inputted into the microcomputer, and malfunction modes including types of malfunctions, a normal condition, and a fire of the squib in the apparatus of FIG. 1.

Like and corresponding elements are denoted by the same reference characters throughout the drawings.

DESCRIPTION OF THE FIRST PREFERRED EMBODIMENT

Figure 1:
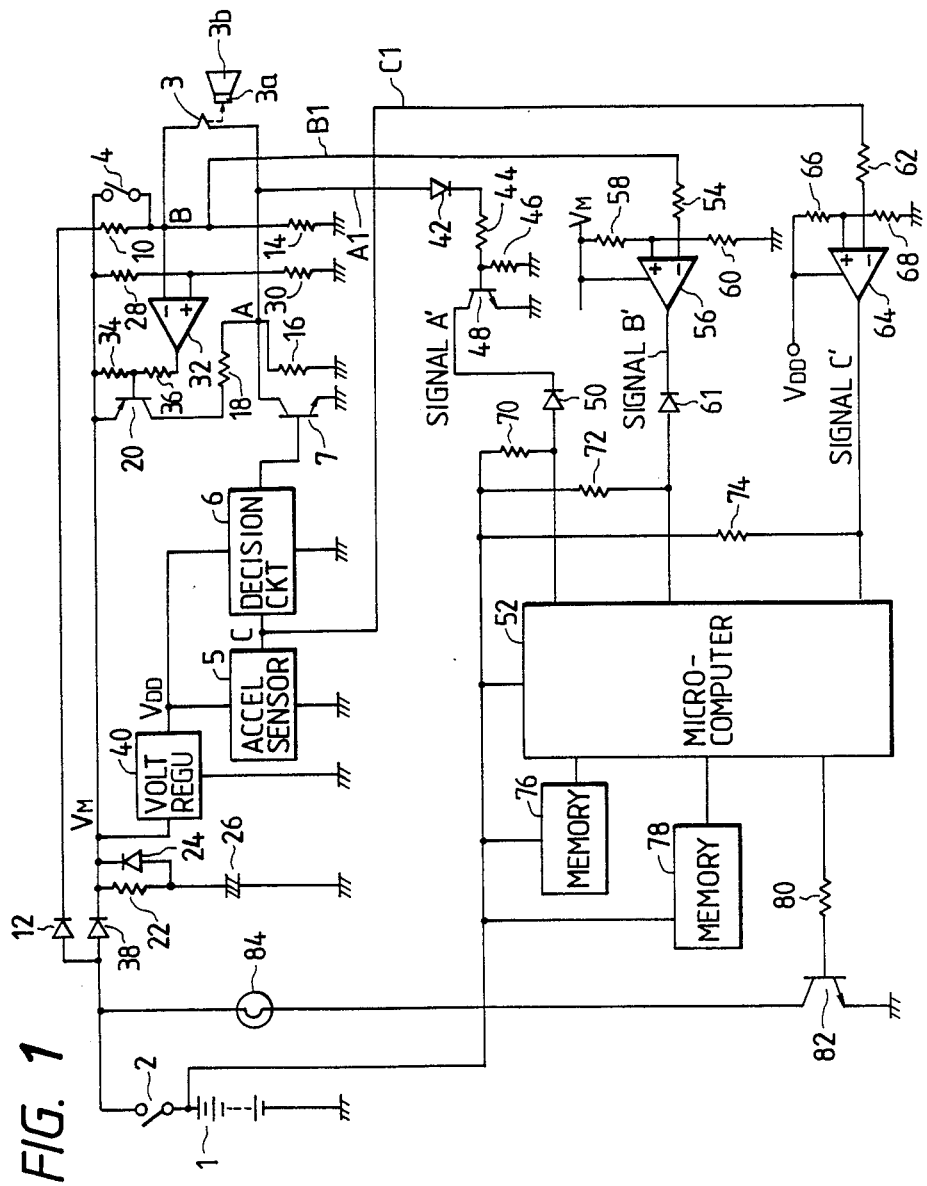
FIG. 1 is a diagram of an apparatus according to a first embodiment of this invention.

With reference to FIG. 1 showing an apparatus of a first embodiment of this invention, an automotive vehicle battery 1 serves as a dc power source. An ignition switch 2 is connected to the battery 1. The ignition switch 2 is actuated together with operation of an automotive engine key (not shown). A known squib 3 serves to fire an explosive 3a to inflate an air bag 3b. The air bag 3b serves to protect an occupant in an automotive vehicle from a collision or crash of the vehicle. The squib 3 includes an electric heating wire having a resistance of about several ohms. A mercury switch 4 serves to prevent a false operation and is closed even at a low acceleration. An acceleration sensor 5 detects acceleration of an automotive vehicle. When the vehicle is braked abruptly or when the vehicle encounters a crash, the acceleration sensor 5 outputs an acceleration signal to a point C or a wiring line C1. For example, the acceleration sensor 5 is of a known semiconductor type including a cantilever and a semiconductor strain gage extending on the cantilever. The mercury switch 4 and the acceleration sensor 5 are disposed within an electronic control unit box (not shown and referred to as an ECU hereinafter) containing electronic circuits. The ECU is placed in a suitable location within the vehicle such as a location under a vehicle seat. A fire decision circuit 6 determines whether or not the squib 3 should be fired on the basis of the output signal from the acceleration sensor 5. A transistor 7 is made conductive or turned on by a fire signal from the fire decision circuit 6. When the transistor 7 is turned on and the mercury switch 4 is closed, the squib 3 is supplied with an electric current adequate to inflate the air bag 3b.

One end of a resistor 10 is connected to the ignition switch 2 via a reverse-current blocking diode 12. The other end of the resistor 10 is connected to one end B of the squib 3 to which the mercury switch 4 is connected. A resistor 14 is connected between the end B of the squib 3 and the ground. The other end A of the squib 3 is grounded via a resistor 16. One end of a resistor 18 is connected to a backup capacitor 26 via a transistor 20 and a reverse-current blocking diode 24. The other end of the resistor 18 is connected to the end A of the squib 3. A resistor 22 is connected in parallel with the diode 24. A series combination of voltage dividing resistors 28 and 30 determines a reference voltage for turning the transistor 20 on. The voltage dividing resistors 28 and 30 are connected to a comparator 32 which turns on the transistor 20 when the potential of the point B reaches a predetermined level VB. A series combination of resistors 34 and 36 determines a base voltage which enables the transistor 20 to be turned on.

The anode of a reverse-current blocking diode 38 is connected to the battery 1 via the ignition switch 2. The cathode of the diode 38 is connected to a power supply line VM. A voltage regulator 40 connected to the power supply line VM derives a constant power supply voltage outputted to a constant power supply line VDD. The acceleration sensor 5 and the fire decision circuit 6 are powered by the constant voltage fed from the voltage regulator 40.

A wiring line A1 extending from the end A of the squib 3 is connected to a series combination of resistors 44 and 46 via a diode 42. The base of a transistor 48 is connected to a junction between the resistors 44 and 46. The resistors 44 and 46 determine a base voltage which enables the transistor 48 to be turned on. The transistor 48 is turned on when the potential of the point A reaches a predetermined voltage which is higher than a zero potential but lower than a given level V2. When the transistor 48 is turned on, the transistor 48 outputs a low level signal "L" to a microcomputer 52 via a diode 50. A junction between the diode 50 and the microcomputer 52 is connected to the battery 1 via a resistor 70.

A wiring line B1 extending from the end B of the squib 3 is connected to a comparator 56 via a resistor 54. A combination of voltage dividing resistors 58 and 60 connected to the power supply line VM determines a reference voltage applied to the comparator 56. The comparator 56 outputs a signal B' to the microcomputer 52 via a diode 61. A junction between the diode 61 and the microcomputer 52 is connected to the battery 1 via a resistor 72.

A junction C between the acceleration sensor 5 and the fire decision circuit 6 is connected to a comparator 64 via a resistor 62. A combination of voltage dividing resistors 66 and 68 connected to the constant power supply line VDD determines a reference voltage applied to the comparator 64. When the acceleration sensor 5 detects a given acceleration and supplies the point C with an electric signal having a voltage equal to or higher than a predetermined level, the comparator 64 outputs a signal C' having a low level "L". Specifically, when the acceleration sensor 5 detects an acceleration caused by a crash or collision of the vehicle, the signal C' goes "L". It should be noted that the character "L" denotes a low level. A junction between the comparator 64 and the microcomputer 52 is connected to the battery 1 via a resistor 74.

The microcomputer 52 performs calculation processes on the basis of the output signals A', B', and C' from the transistor 48, the comparator 56, and the comparator 64 in order to judge whether or not a malfunction occurs with the squib 3, the mercury switch 4, and the transistor 7. Upon the occurrence of such a malfunction, the microcomputer 52 stores a malfunction-representing signal into a memory 76 and turns on a transistor 82 via a resistor 80 to activate a warning lamp 84. For example, the memory 76 is composed of a non-volatile RAM. The microcomputer 52 also has a function of judging whether or not an activation of the air bag 3b is performed by a false cause. Upon the occurrence of such a false activation of the air bag 3b, the microcomputer 52 stores a false-fire-representing signal into a memory 78. For example, the memory 78 is composed of a non-volatile RAM. The microcomputer 52, and the memories 76 and 78 are connected to the battery 1 to be directly powered by the battery 1.

In operation of the apparatus of this embodiment, when the ignition switch 2 is closed, the circuit for activating the squib 3a is moved into an operable state. In the case where the squib activating circuit remains in its operable state, when the mercury switch 4 is closed and the transistor 7 is turned on, the squib 3 is activated so that the explosive 3a is fired and the air bag 3b is inflated. Closing the ignition switch 2 allows the backup capacitor 26 to be quickly charged to a battery voltage. In the event that the supply of an electric current from the battery 1 is insufficient, the charged backup capacitor 26 can output an electric current adequate to activate the squib 3.

As shown in FIG. 2, the voltages at the points A and B depend on conditions of the squib 3, the mercury switch 4, and the transistor 7. The transistor 48 and the comparator 56 converts the voltages at the points A and B into the corresponding binary signals A' and B' which represent the conditions of the devices 3, 4, and 7.

In cases where at least one of the squib 3, the mercury switch 4, and the transistor 7 malfunctions, breaks, or short-circuits after the ignition switch 2 is closed, the microcomputer 52 detects such a malfunction from the output signals A' and B' of the transistor 48 and the comparator 56 and turns on the transistor 82 to activate the warning lamp 84.

Figure 3:
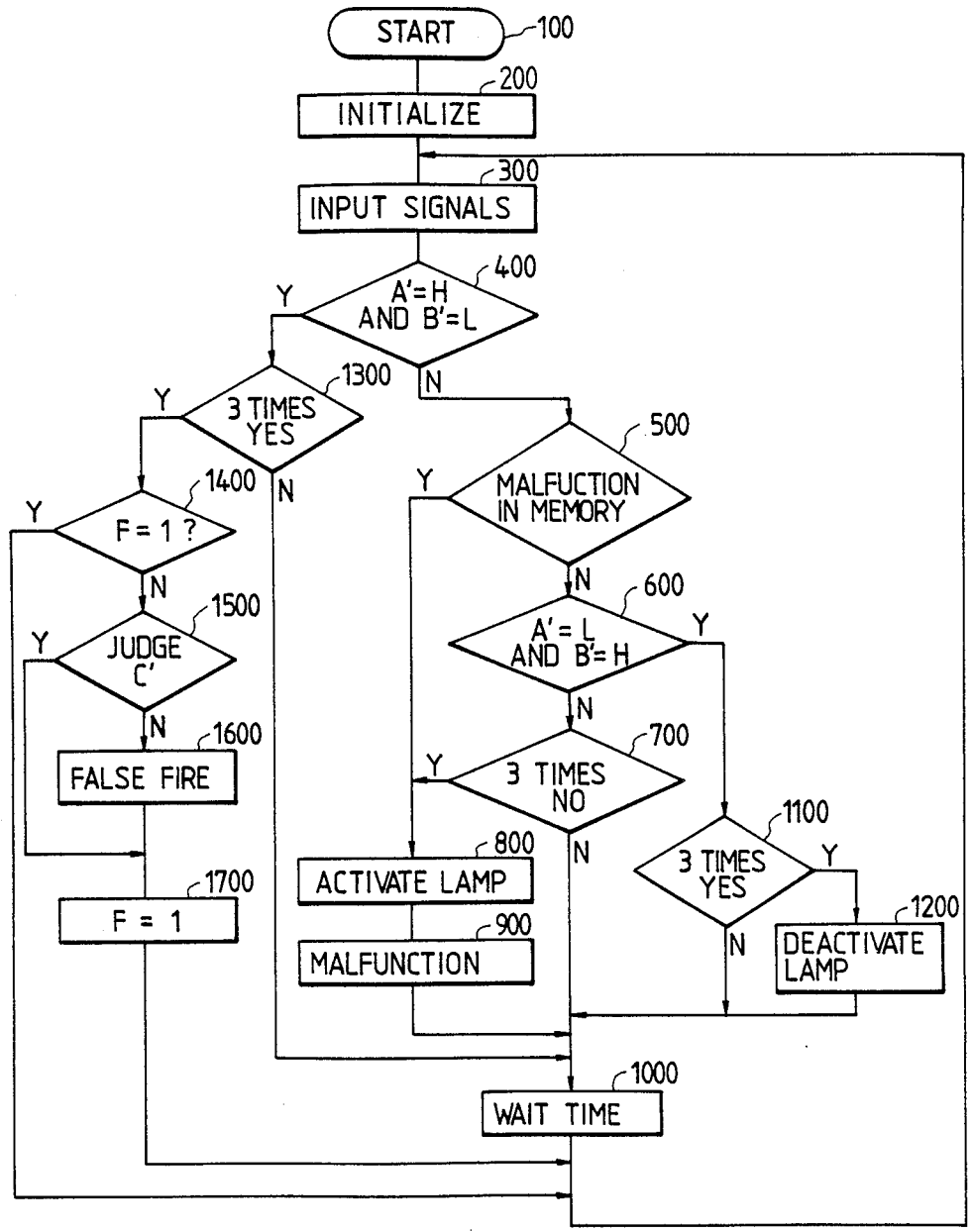
FIG. 3 is a flowchart of a program operating the microcomputer of FIG. 1.

The microcomputer 52 includes a combination of an I/O port, a CPU, a ROM, and a RAM. The microcomputer 52 operates in accordance with a program stored in the ROM. FIG. 3 is a flowchart of this program.

As shown in FIG. 3, when the ignition switch 2 is closed, the program starts at a step 100 and then advances to a step 200 which executes initialization. Specifically, the step 200 initializes and clears the flag F and the memories 76 and 78 to "0". It should be noted that the character "0" denotes a logic "0". After the step 200, the program advances to a step 300. The step 300 inputs the signals A', B', and C'. A step 400 following the step 300 judges whether or not the signal A' is "H" and the signal B' is "L", that is, whether or not the squib 3 is activated (fired) as understood from FIG. 2. It should be noted that the characters "H" and "L" denoted high and low levels respectively. When the signal A' is "H" and the signal B' is "L", that is, when the squib 3 is activated, the program advances from the step 400 to a step 1300. Otherwise the program advances from the step 400 to a step 500.

The step 500 judges whether or not a malfunction-representing signal is already stored in the memory 76. When a malfunction-representing signal is already stored in the memory 76, that is, when a malfunction previously occurs, the program advances from the step 500 to a step 800 which turns on the transistor 82 to activate the warning lamp 84. A step 900 following the step 800 stores a malfunction-representing signal into the memory 76. After the step 900, the program returns to the step 300 via a step 1000 which waits for a predetermined time, for example, 1 ms.

When any malfunction-representing signal is not stored in the memory 76, that is, when any malfunction has not occurred, the program advances from the step 500 to a step 600. The step 600 judges whether or not the signal A' is "L" and the signal B' is "H", that is, whether or not all of the squib 3, the mercury switch 4, and the transistor 7 are normal as understood from FIG. 2. When at least one of the squib 3, the mercury switch 4, and the transistor 7 is malfunctioning, the program advances from the step 600 to a step 700. When all of the squib 3, the mercury switch 4, and the transistor 7 are normal, the program advances from the step 600 to a step 1100.

The step 700 determines whether or not the preceding step 600 continues to judge at least one of the devices 3, 4, and 7 to be malfunctioning in three consecutive cycles of execution of the program. When the step 600 judges at least one of the devices 3, 4, and 7 to be malfunctioning for the first time or in two consecutive cycles of execution of the program, the program returns from the step 700 to the step 300 via the step 1000. When the step 600 judges at least one of the devices 3, 4, and 7 to be malfunctioning in three consecutive cycles of execution of the program, the program advances from the step 700 to the step 800 which turns on the transistor 82 to activate the warning lamp 84. As described previously, the step 900 following the step 800 stores a malfunction-representing signal into the memory 76. After the step 900, the program returns to the step 300 via the step 1000.

The step 1100 determines whether or not the preceding step 600 continues to judge all of the devices 3, 4, and 7 to be normal in three consecutive cycles of execution of the program. When the step 600 judges all of the devices 3, 4, and 7 to be normal for the first time or in two consecutive cycles of execution of the program, the program returns from the step 1100 to the step 300 via the step 1000. When the step 600 judges all of the devices 3, 4, and 7 to be normal in three consecutive cycles of execution of the program, the program advances from the step 1100 to a step 1200 which turns off the transistor 82 to deactivate the warning lamp 84. After the step 1200, the program returns to the step 300 via the step 1000.

The step 1300 determines whether or not the preceding step 400 continues to judge the signals A' and B' to be "H" and "L" respectively in three consecutive cycles of execution of the program. When the step 400 judges the signals A' and B' to be "H" and "L" respectively for the first time or in two consecutive cycles of execution of the program, the program returns from the step 1300 to the step 300 via the step 1000. When the step 400 continues to judge the signals A' and B' to be "H" and "L" respectively in three consecutive cycles of execution of the program, the program advances from the step 1300 to a step 1400. The step 1400 judges whether or not the flag F is "1". It should be noted that the character "1" denotes a logic "1". When the flag F is "1", the program returns from the step 1400 to the step 300. When the flag F is not "1", the program advances from the step 1400 to a step 1500.

The step 1500 determines whether or not the signal C' went "L" during last 10 ms, that is, whether or not the acceleration sensor 5 detected a crash or collision acceleration during last 10 ms. In the case where the signal C' went "L" within last 10 ms, that is, the case where the acceleration sensor 5 detected a crash or collision acceleration during last 10 ms, the microcomputer 52 judges the present activation (fire) of the squib 3 to be responsive to a correct cause and the program returns from the step 1500 to the step 300 via a step 1700 which sets the flag F to "1". Accordingly, the flag F equal to "1" represents that the present activation (fire) of the squib 3 is correct. In the case where the signal C' did not go "L" within last 10 ms, that is, in the case where the acceleration sensor 5 did not detect any crash or collision acceleration during last 10 ms, the microcomputer 52 judges the present activation of the squib 3 to be responsive to a wrong or false cause and the program advances from the step 1500 to a step 1600. The step 1600 stores a false-fire-representing signal or a "1" signal into the memory 78. After the step 1600, the program returns to the step 300 via the step 1700.

The steps 1400 and 1700 related to the flag F enable the judgment step 1500 to be executed once.

The operation of the apparatus of this embodiment will be further described hereinafter with reference to FIGS. 1 and 2. In the following description, the characters V1, V2, V3, V4, V5, V6, and VB denote voltages values having a relationship as "$0 < V1 < V2 < V3 < V4 < V5 < V6 < VB$".

In cases where the squib 3, the mercury switch 4, the transistor 7, and the other devices are normal, the voltages at the points A and B are equal to the values V3 and V4 respectively. Specifically, the voltages at the points A and B are equal to the values V3 and V4 respectively under conditions where the mercury switch 4 is open, the transistor 7 is nonconductive or off, the transistor 48 is conductive or on, the transistor 20 is nonconductive or off, and the voltage VB of the battery 1 is applied to the squib 3 via the diode 12 and the resistor 10. When the voltages at the points A and B are equal to the values V3 and V4 respectively, the voltage V3 at the point A turns on the transistor 48. It should be noted that the resistors 44 and 46 are chosen to turn on the transistor 48 when the voltage at the point A reaches a given level between 0 and the value V2. As described previously, the value V2 is smaller than the value V3. When the transistor 48 is turned on, the output signal A' from the transistor 48 goes "L". The voltage V4 at the point B is compared by the comparator 56 with the reference voltage determined by the resistors 58 and 60, causing the output signal B' from the comparator 56 to be "H". It should be noted that the resistors 58 and 60 are chosen to cause the output signal from the comparator 56 to be "L" when the voltage at the point B reaches a given level between the values V5 and VB. As described previously, the value V5 is greater than the value V4 but smaller than the value VB.

In cases where the squib 3 breaks, the voltages at the points A and B become equal to 0 and the value V5 respectively. Specifically, the voltage at the point B equals the value V5 under conditions where the battery voltage VB is applied to the series combination of the resistors 10 and 14. In these cases, the break of the squib 3 turns off the transistor 48 so that the signal A' goes "H". In addition, the voltage V5 at the point B causes the output signal B' from the comparator 56 to be "H". In response to the "H" signals A' and B', the microcomputer 52 stores a malfunction-representing signal into the memory 76 and turns on the transistor 82 to activate the warning lamp 84.

In cases where the mercury switch 4 short-circuits, as shown in FIG. 2, the voltages at the points A and B become equal to the values V6 and VB respectively. When the voltage at the point B is close to the value VB, and for example when the voltage at the point B is equal to or higher than the value V6, the comparator 32 outputs an "L" signal which turns on the transistor 20. It should be noted that the resistors 28 and 30 are chosen to cause the output signal from the comparator 32 to be "L" when the voltage at the point B is equal to or higher than the value V6. When the transistor 20 is turned on, an electric current is supplied to the resistor 18 from the battery 1 so that the voltage at the point A becomes equal to the value V6. As a result, the output signal A' from the transistor 48 goes "L". The voltage VB at the point B causes the output signal B' from the comparator 56 to be "L". In response to the "L" signals A' and B', the microcomputer 52 stores a malfunction-representing signal into the memory 76 and turns on the transistor 82 to activate the warning lamp 84.

In cases where the transistor 7 is made erroneously conductive or turned on by some malfunction, the voltages at the points A and B become equal to 0 and the value V1 respectively so that both of the signals A' and B' go "H". In response to the "H" signals A' and B', the microcomputer 52 stores a malfunction-representing signal into the memory 76 and turns on the transistor 82 to activate the warning lamp 84.

In cases where the squib 3 is fired or activated in response to a crash or collision of the vehicle, the voltages at the points A and B become equal to 0 and the value VB respectively. In these cases, although the transistor 20 is turned on, the mercury switch 4 is closed and the transistor 7 is turned on by the signal from the decision circuit 6. Therefore, an electric current flows through the squib 3 and fires or activates the squib 3. In these cases, the signals A' and B' become "H" and "L" respectively so that the microcomputer 52 neither stores a malfunction-representing signal into the memory 76 nor turns on the transistor 82. In addition, the signal C' is made "L" in response to the crash or collision of the vehicle so that the step 1600 of FIG. 3 is jumped and thus the microcomputer 52 does not store a false-fire-representing signal into the memory 78.

In cases where the squib 3 is fired or activated by an erroneous cause such as a malfunction of the mercury switch 4 or a malfunction of the transistor 7, a crash or collision acceleration is absent so that the signal C' remains "H". Therefore, the step 1600 of FIG. 3 is executed and thus the microcomputer 52 stores a false-fire-representing signal into the memory 78.

In cases where the squib 3 breaks and the mercury switch 4 short-circuits, the voltage at the point B becomes equal to the value VB in response to the short circuit of the mercury switch 4. When the voltage at the point B equals the value VB, the output signal B' from the comparator 56 goes "L" and the comparator 32 outputs and "L" signal which turns on the transistor 20. As a result of the turning on of the transistor 20, an electric current flows from the battery 1 into the point A via the diode 38 and the resistor 18 and thus the voltvoltage at the point A becomes equal to the value V2. When the voltage at the point A equals the value V2, the output signal A' from the transistor 48 goes "L". In response to the "L" signals A' and B', the microcomputer 52 stores a malfunction-representing signal into the memory 76 and turns on the transistor 82 to activate the warning lamp 84.

In cases where the squib 3 breaks and the transistor 7 is erroneously turned on, the voltages at the points A and B become equal to 0 and the value V5 respectively so that both of the signals A' and B' go "H". In response to the "H" signals A' and B', the microcomputer 52 stores a malfunction-representing signal into the memory 76 and turns on the transistor 82 to activate the warning lamp 84.

This embodiment has the following advantages. As understood from the previous description, in the case where the squib 3 is fired, the step 1500 determines whether or not the fire of the squib 3 is triggered by such a correct cause as a collision impact. When the fire of the squib 3 is triggered by a false cause, the step 1600 stores a false-fire-representing signal into the memory 78. Since the combination of the steps 1400 and 1700 enables the steps 1500 and 1600 to be executed at most once, the information stored in the memory 78 remains unchanged after the execution of the steps 1500 and 1600. Therefore, the information stored in the memory 78 is reliable. In addition, a malfunction of the squib 3, the mercury switch 4, or the transistor 7 is detected and the malfunction-representing signal is stored into the memory 76. Furthermore, in the event that the battery 1 does not supply a sufficient electric current to the squib 3 when the squib 3 is required to be fired, the backup capacitor 26 supplies an electric current adequate to fire the squib 3. In this case, most of the electric current generated from the backup capacitor 26 is used to fire the squib 3. Therefore, the capacitance of the backup capacitor 26 can be relatively small.

It should be noted that this embodiment may be modified in various ways as described hereinafter. In a first modification of this embodiment, the mercury switch 4 and the semiconductor-type acceleration sensor 5 are replaced by a plurality of mechanical-type acceleration sensors. In a second modification of this embodiment, when the step 1500 detects that the fire of the squib 3 is triggered by a correct cause, an added step stores a correct-fire-representing signal into the memory 76 or another memory. In a third modification of this embodiment, the microcomputer 52 and the memories 76 and 78 are powered by the constant voltage outputted from the voltage regulator 40.

DESCRIPTION OF THE SECOND PREFERRED EMBODIMENT

Figure 4:
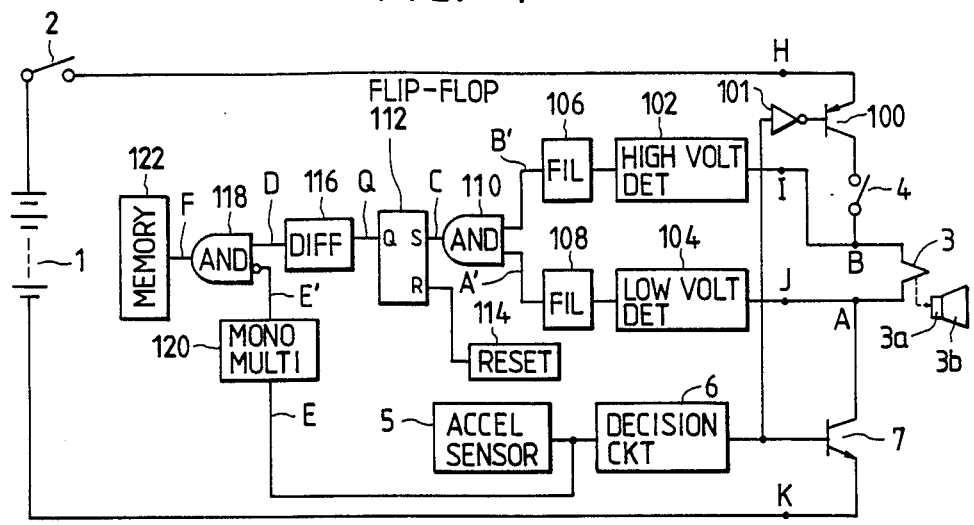
FIG. 4 is a block diagram of an apparatus according to a second embodiment of this invention.

With reference to FIG. 4 showing an apparatus of a second embodiment of this invention, a transistor 100 is turned on and off in response to an output signal from a fire decision circuit 6. The output signal from the fire decision circuit 6 is transmitted to the transistor 100 via an inverter 101. An ignition switch 2, the transistor 100, a mercury switch 4, a squib 3, and a transistor 7 are connected in series with a battery 1.

A high potential detector 102 detects a voltage at one end B of the squib 3. Specifically, the high potential detector 102 outputs a "1" signal when the voltage at the point B is equal to or higher than a reference voltage. Otherwise the high potential detector 102 outputs a "0" signal. A low potential detector 104 detects a voltage at the other end A of the squib 3. Specifically, the low potential detector 104 outputs a "1" signal when the voltage at the point A is equal to or lower than another reference voltage. Otherwise the low potential detector 104 outputs a "0" signal. Output signals B' and A' from the potential detectors 102 and 104 are transmitted to input terminals of an AND circuit 110 via noise filters 106 and 108 respectively. When both of the signals A' and B' are "1", the AND circuit 110 outputs a "1" signal representing a fire of the squib 3.

A set terminal of a flip-flop circuit 112 is connected to the output terminal of the AND circuit 110. The flip-flop circuit 112 is set by a rising edge of a "1" signal from the AND circuit 110. When the ignition switch 2 is closed, the flip-flop circuit 112 is reset by a signal outputted from a reset circuit 114. An output signal Q from the flip-flop circuit 112 is applied to a differentiating circuit 116 which serves as a timer. The differentiating circuit 116 outputs a pulse when the signal Q changes from "0" to "1". For example, the differentiating circuit 116 is composed of a one-shot multivibrator. A first input terminal of an AND circuit 118 receives an output signal D from the differentiating circuit 116. An output signal E' from a monostable multivibrator 120 is inverted and is then applied to a second input terminal of the AND circuit 118. An output signal E from an acceleration sensor 5 is fed to the fire decision circuit 6 and the monostable multivibrator 120. A memory 122 is subjected to an output signal F from the AND circuit 118. As will be made clear hereinafter, when the squib 3 is fired by a false cause, the AND circuit 118 outputs a "1" signal which is stored into the memory 122 as a false-fire-representing signal.

Figure 5:
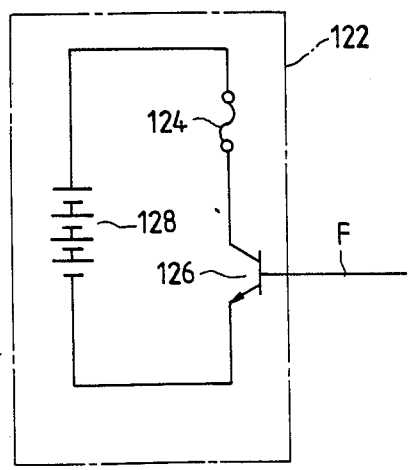
FIG. 5 is a schematic diagram of the memory of FIG. 4.

As shown in FIG. 5, the memory 122 includes a fuse 124 and a transistor 126 which are connected in series with a backup power supply 128. The transistor 126 is connected to the AND circuit 118 (see FIG. 4). When the output signal F from the AND circuit 118 becomes "1", the transistor 126 is turned on so that an electric current flows through the fuse 124 and makes the fuse 124 blown.

Figure 6:
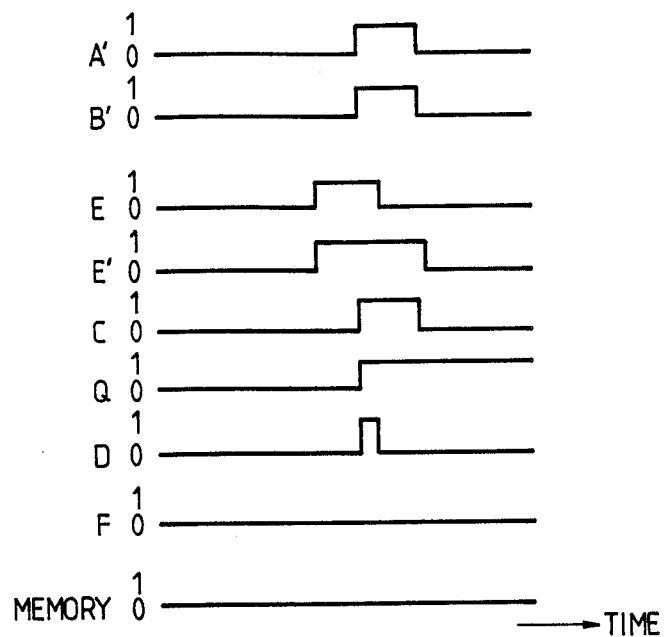
FIG. 6 is a timing chart showing the waveforms of the various signals in the apparatus of FIG. 4 which occur under conditions where the squib is fired by a correct cause.

The operation of the apparatus of this embodiment will be described hereinafter. FIG. 6 is a timing chart related to conditions where the squib 3 is fired by such a correct cause as a collision impact. Under these conditions, the mercury switch 4 is closed and the acceleration sensor 5 outputs a collision or crash acceleration signal or a "1" signal E to the fire decision circuit 6 and the monostable multivibrator 120. The fire decision circuit 6 turns on the transistor 7 in response to the collision acceleration signal E so that the squib 3 is supplied with an activation current from the battery 1. The activation current energizes (fires) the squib 3, inflating a related air bag. When the activation current flows through the squib 3, the high potential detector 102 and the low potential detector 104 detect a high voltage and a low voltage respectively and output "1" signals B' and A' to the AND circuit 110 via the noise filters 106 and 108. In response to the "1" signals B' and A', the AND circuit 110 outputs a "1" signal C to the flip-flop circuit 112 and sets the flip-flop circuit 112 so that the output signal Q from the flip-flop circuit 112 changes from "0" to "1". The differentiating circuit 116 outputs a "1" pulse D of a predetermined duration in response to the change of the signal Q from "0" to "1". The "1 " pulse D is applied to the AND circuit 118. The monostable multivibrator 120 outputs a "1" signal E' in response to the collision acceleration signal E. The duration of the "1" pulse E' is longer than the duration of the "1" pulse E. The "1" signal E' is inverted and is then applied to the AND circuit 118. Since the duration of the "1" pulse D resides within the duration of the "1" signal E', the output signal F from the AND circuit 118 remains "0" so that the transistor 126 continues to be off. Therefore, the fuse 124 remains unmelted.

Figure 7:
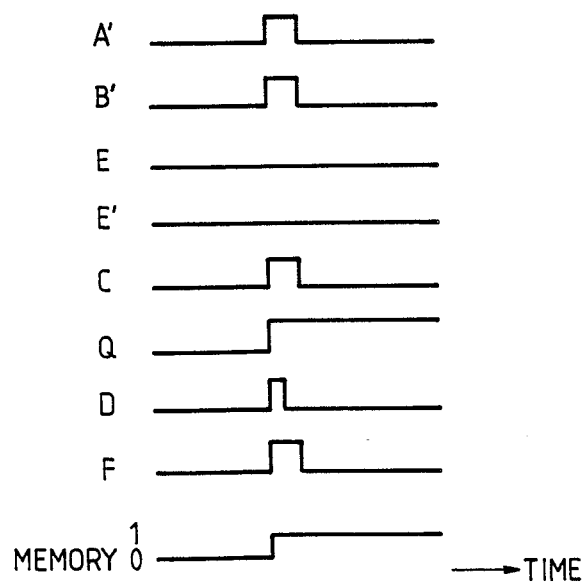
FIG. 7 is a timing chart showing the waveforms of the various signals in the apparatus of FIG. 4 which occur under conditions where the squib is fired by a false cause.

FIG. 7 is a timing chart related to conditions where the squib 3 is fired by such a false cause as a short circuit between wiring points H and I or between wiring points J and K (see FIG. 4). It is now assumed that the squib 3 is fired by a short circuit which causes a considerable current to flow through the squib 3. Under these conditions, the output signal E from the acceleration sensor 5 remains "0" and thus the output signal E' from the monostable multivibrator 120 remains "0" also. The "0" signal E' is inverted and is then applied to the AND circuit 118. Since the current flows through the squib 3, both of the output signals B' and A' from the high potential detector 102 and the low potential detector 104 become "1" as in the case of FIG. 6. Therefore, the signal D outputted from the differentiating circuit 116 to the AND circuit 118 becomes "1" as in the case of FIG. 6. As a result, the AND circuit 118 outputs a "1" signal F to the memory 122, turning on the transistor 126 and making the fuse 124 blown. In this way, a false fire of the squib 3 is recorded into the memory 122. Specifically, the blown fuse 124 indicates the false fire of the squib 3.

Figure 8:
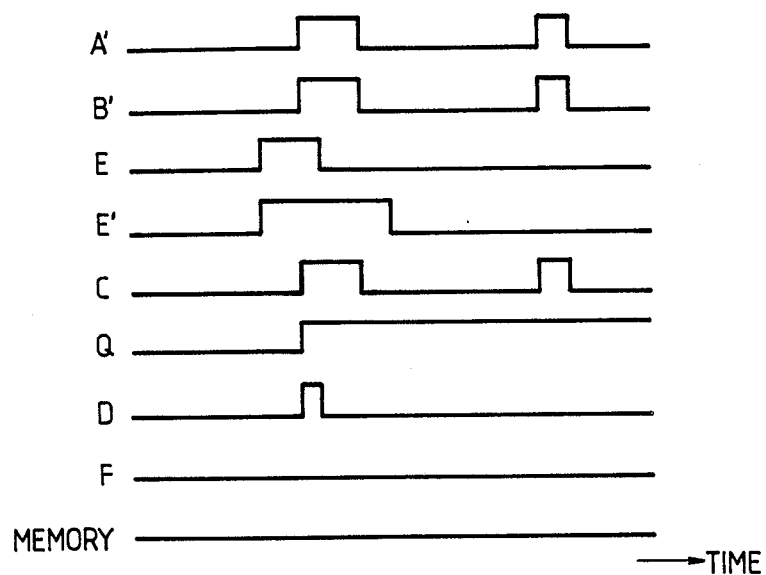
FIG. 8 is a timing chart showing the waveforms of the various signals in the apparatus of FIG. 4 which occur under conditions where the squib is fired by a correct cause and then a condition similar to a fire of the squib due to a false cause takes place.

FIG. 8 is a timing chart related to conditions where the squib 3 is fired by a correct cause and then a situation similar to a false fire of the squib 3 occurs due to a short circuit or the like. Under these conditions, during a first period where the squib is fired by a correct cause, the signal F outputted from the AND circuit 118 to the memory 122 remains "0" as in the case of FIG. 6. During a subsequent period, when a situation similar to a false fire of the squib 3 occurs due to a short circuit or the like, both of the output signals B' and A' from the high potential detector 102 and the low potential detector 104 become "1" so that the signal C outputted from the circuit 110 to the flip-flop circuit 112 also becomes "1". Since the output signal Q from the flip-flop circuit 112 is set in response to the correct fire of the squib 3, the output signal Q from the flip-flop circuit 112 remains unchanged independent of the change of the signal C which responds to the situation similar to the false fire of the squib 3. As a result, the differentiating circuit 116 does not output a "1" signal D to the AND circuit 118 in response to the situation similar to the false fire of the squib 3 so that the signal F outputted from the AND circuit 118 to the memory 122 remains "0" independent of the situation similar to the false fire of the squib 3. Therefore, the transistor 126 remains off and the fuse 124 continues to be unmelted independent of the situation similar to the false fire of the squib 3.

The second embodiment of this invention has the following advantage. As understood from the previous description, after the memory 122 stores a signal representing whether a fire of the squib 3 is caused by a correct cause or a false cause, signal writing into the memory 122 is inhibited. Therefore, in cases where the squib 3 is fired by a correct cause and then a situation similar to a false fire of the squib 3 occurs due to a short circuit or the like, the memory 122 is prevented from storing a false-fire-representing signal so that the information indicated by the memory 122 is reliable.

What is claimed is:

1. An apparatus for recording an operating condition of a vehicle safety device, comprising:

means for triggering the safety device when supplied with an electric current equal to or greater than a reference electric current;

means for detecting an acceleration of a vehicle which is caused by a collision of the vehicle, and outputting an electric signal depending on the detected vehicle acceleration;

means for deciding whether or not the triggering means should be activated on the basis of the electric signal from the acceleration detecting means;

switch means, turned on in response to an output signal from the deciding means, for supplying an electric current equal to or greater than the reference electric current to the triggering means to activate the triggering means;

means for detecting voltages at respective two ends of the triggering means;

means for detecting an activating condition of the triggering means on the basis of the detected voltages;

activation storing means for storing the detected activating condition of the triggering means;

collision storing means for, when the acceleration detecting means detects the collision acceleration, storing the detection of the collision acceleration by the acceleration detecting means;

means for judging the triggering means to be activated by a correct cause in cases where, during a predetermined time starting from a moment of the detection of the collision acceleration by the acceleration detecting means, the activation storing means stores the activating condition of the triggering means and the collision storing means stores the detection of the collision acceleration by the acceleration detecting means, for judging the triggering means to be activated by a false cause in other cases, and for outputting a signal representing a result of the judgments;

means responsive to the output signal from the judging means for recording that the triggering means is activated by a false cause; and means for limiting a number of times of the judgments by the judging means to one.

2. An apparatus for recording an operating condition of a vehicle safety device, comprising:

a squib for triggering the safety device when supplied with an electric current equal to or greater than a reference electric current;

an acceleration sensor for detecting an acceleration of a vehicle which is caused by a collision of the vehicle, and outputting an electric signal depending on the detected vehicle acceleration;

a fire decision circuit for deciding whether or not the squib should be fired on the basis of the electric signal from the acceleration sensor;

a first switch, connected to the squib and turned on in response to a fire signal from the decision circuit, for supplying an electric current equal to or greater than the reference electric current to the squib to fire the squib;

a first connection point and a second connection point connected to respective two ends of the squib and conducting voltages at the respective two ends of the squib;

a second switch turned on and outputting a first signal when a voltage at the first connection point is equal to or higher than a first reference voltage;

a third switch outputting a second signal when a voltage at the second connection point exceeds a second reference voltage;

a fourth switch outputting a third signal depending on the electric output signal from the acceleration sensor;

a microcomputer performing calculation processes on the basis of the first signal, the second signal, and the third signal;

a memory receiving an output signal from the microcomputer;

wherein the microcomputer comprises:

means for judging whether or not the squib is fired on the basis of the first signal and the second signal;

means for, when the squib is judged to be fired, judging the fire of the squib to be performed by a false cause in cases where the acceleration sensor does not output an electric signal of a level equal to or higher than a predetermined level for a last predetermined time interval;

means for recording information into the memory, the information representing that the fire of the squib is performed by the false cause; and means for limiting a number of times of the recording of the information into the memory to one.

3. An apparatus for recording an operating condition of a vehicle safety device, comprising:

a squib for triggering the safety device when supplied with an electric current equal to or greater than a reference electric current;

an acceleration sensor for detecting an acceleration of a vehicle which is caused by a collision of the vehicle, and outputting an electric output signal depending on the detected vehicle acceleration;

a fire decision circuit for deciding whether or not the squib should be fired on the basis of the electric signal from the acceleration sensor;

a first switch, connected to the squib and turned on in response to a fire signal from the decision circuit, for supplying an electric current equal to or greater than the reference electric current to the squib to fire the squib;

a first connection point and a second connection point connected to respective two ends of the squib and conducting voltages at the respective two ends of the squib;

a second switch turned on and outputting a first signal when a voltage at the first connection point is equal to or lower than a first reference voltage;

a third switch outputting a second signal when a voltage at the second connection point exceeds a second reference voltage;

a fourth switch outputting a third signal in response to the electric output signal from the acceleration sensor which has a level equal to or greater than a predetermined level, the third signal having a predetermined short duration;

a storage circuit set in response to the first signal and the second signal and outputting a fourth signal only once when being set, the fourth signal having a predetermined short duration;

a fifth switch for judging whether the fire of the squib is performed by a correct cause or a false cause on the basis of the third signal and the fourth signal, and for outputting a false-fire-representing signal when the fire of the squib is performed by the false cause; and a memory for recording the false-fire-representing signal.

* * * * *